3,254,120
N-(TERTIARYAMINOALKOXY-BENZOYL)
ANILIDES
Albin Mayr and Rudolf Baldt, Innsbruck, Austria, assignors to Pharmazeutische Fabrik Montavit Gesellschaft m.b.H., Absam, near Solbad Hall, Austria, a corporation of Austria
No Drawing. Filed Nov. 28, 1962, Ser. No. 240,743
Claims priority, application Austria, Dec. 5, 1961,
A 9,228/61
10 Claims. (Cl. 260—559)

This invention relates to new compositions of matter. More particularly, it relates to new compositions of matter which are pharmacologically effective in relaxing spasm, i.e., in providing a beneficial spasmolytic effect, and processes for preparing the same.

The object of this invention is to provide the aforesaid new composition of matter and their processes of preparation.

Generally speaking, and in accordance with the invention, there is provided novel basic ethers having the general formula

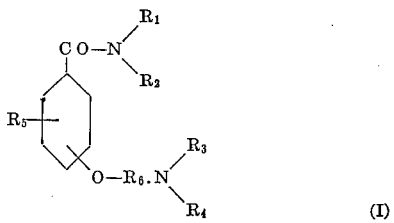

and the process for making these ethers. In the above depicted general formula $R_1$ represents a member selected from the group consisting of phenyl, methylphenyl, chlorophenyl and nitrophenyl, $R_2$ represents a member selected from the group consisting of hydrogen and phenyl, $R_3$ represents a member selected from the group consisting of hydrogen and lower alkyl radicals, $R_4$ represents a lower alkyl radical, $R_5$ represents hydrogen and $R_6$ represents a lower alkylene radical.

Also provided in accordance with the invention are the salts and quaternary ammonium compounds of these ethers as well as to the processes for their making.

"Lower alkyl" and "short chain carbon radicals" in the context of this application signifies an alkyl or an alkylene radical wherein the main carbon chain comprises from 1 to 4 carbon atoms.

The compounds of this invention are pharmacologically effective and in animal experiments, both in vivo and in vitro, they exhibit a surprisingly good spasm relaxing (spasmolytic) effect which is unexpected in this class of compounds. This effect is especially distinct in the case of barium chloride spasms but can also be observed with acetylcholine histamine spasms. Moreover, most of these compounds also have an analgesic and sedative effect.

For example, the novel basic ethers obtained in Example 6 showed the following results of tests carried out on animals:

(a) Acute toxicity: $LD_{50}$ amounts with mice: intravenous 34.5 mg./kg., peroral 3,600 mg./kg.

(b) Spasmolysis in vitro: spasmolysis effected by these compounds was experienced on the isolated ileum of the guinea pig against spasm produced by barium chloride, carbaminoyl choline chloride and histamine. The effect of this compound as compared to the spasmolytic effect of atropine, diphenhydramine and papaverine are set forth in the following table:

The following effective concentrations ($\gamma$/25 ml.) were found in the isolated ileum of the guinea pig:

| Spasm evoked by— | Carbaminoyl choline chloride | Histamine | BaCl$_2$ |
|---|---|---|---|
| M 811 | 6.05 | 75.3 | 16.5 |
| Atropine | 0.082 | | |
| Diphenhydramine | | 0.284 | |
| Papaverine | | | 274.0 |

(c) Spasmolysis in vivo: spasmolysis effected by these compounds was experienced using the method of Brock et al. (Arch. exp. Pathol. Pharmacol., 215, 512, 1952). As an $ED_{50}$ against the spasm evoked by barium chloride, there were found 2.5 mg./kg., whereas an $ED_{50}$ amounting to 7.0 mg./kg. was produced by papaverine.

(d) The analgesic effect of these novel basic ethers on mice was determined using the hot plate method of Janssen and Jageneau (J. Pharm. Pharmacol., 9:381, 1957). Their analgesic effect was found to be $\frac{1}{10}$ of that of morphine and twice that of amidopyrine.

(e) The sedative effect of these novel basic ethers was determined using the method of Zipf and Altstaedter (Drug Research 4:14, 1954) by tests on mice. The lowest hypnotic dosage thereof amounted to 100 mg./kg. and the corresponding dosage for phenobarbital was 75 mg./kg.

The novel basic ethers of the invention can be produced by one of the conventional methods used in the preparation of basic ethers. For instance, a compound of the general formula

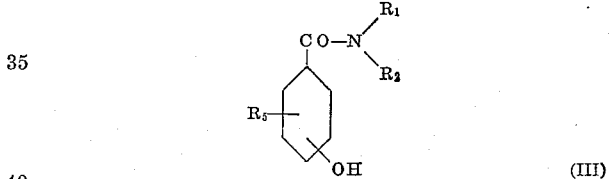

or its alkaline salts (phenolates) wherein $R_1$, $R_2$ and $R_5$ have the same significance as set forth hereinabove in the description of Formula I may be reacted with reactive esters, particularly esters formed by reacting a halogen acid with an amino alcohol, monoalkyl-amino alcohol, or dialkyl-amino alcohol. The products obtained by using amino alcohols or monoalkyl-amino alcohols are then alkylated in the usual way, e.g., with formic acid and formaldehyde or with dimethyl sulfate.

It is, however, also possible to condense the compound of Formula III or its alkaline salts with acetals of $\alpha$-halogenated aldehydes and to react the condensation products thus obtained with dialkyl formamides in the presence of formic acid or to hydrogenate them in the presence of a dialkyl amine after a preceding cold or hot saponification of the acetal groups.

The new basic ether of the general Formula I may also be obtained by reacting the alkali salts of the compounds of general Formula III with alkylene halides and thereafter, reacting the reaction product with secondary or tertiary amines, or by reacting the compound of Formula III with alkylene chlorohydrins, and substituting the hydroxyl group with a halogen, e.g., reacting with thionyl chloride, and with dialkyl amines.

If, in the aforementioned reactions, the alkali compounds of Formula III are replaced with reactive hydroxy benzoyl derivatives, for example, by the potassium salt of o-hydroxy benzoic methyl ester, there are obtained basic ethers of reactive hydroxy benzoyl derivatives which can be converted to the basic ethers of general Formula I of the invention, e.g., by adding aniline and heating with metallic sodium.

Preferably alkyl halides substituted with basic groups and having the formula

(II)

where $R_3$ and $R_4$ have the same significance as in formula I and where $R_7$ is halogenated lower alkyl radical, are reacted with a compound of the general formula

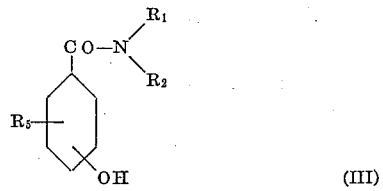
(III)

where $R_1$, $R_2$ and $R_5$ have the same significance as has been defined for them in Formula I, using, if necessary, a solvent and/or an alkaline condensing agent. This preference also applies to the reaction of a compound of Formula III with a salt of a compound of Formula II. In the latter situation, if necessary, twice the stoichiometric amount of the alkaline condensing agent may be required, as it may also be required for the reaction of an alkali salt of a compound of Formula III with an alkyl halide having basic substituents.

Surprisingly, it has been found that the use of a ketone, such as acetone, methyl-ethyl ketone, results in particularly high yields and high purity of the final products, although the reaction can also be performed in other solvents, such as lower aliphatic alcohols, or aromatic hydrocarbons.

Furthermore, the compounds of the invention can be produced also by first etherizing reactive hydroxy benzoyl derivatives with basic substituents containing alkyl halides and subsequently converting the basic ethers thus obtained to the compounds of the invention defined in general Formula I.

The following examples are illustrative of the invention. It is understood that these examples are given by way of illustration and the scope of the invention is not intended to be restricted thereby.

*Example 1*

A mixture of 28.9 g. (1/10 mole) of o-hydroxy benzoyl diphenyl amide, 200 ml. of methanol, and 4 g. of NaOH is heated until it boils, 13.56 g. diethyl-amino ethyl chloride dissolved in 50 ml. methanol are added dropwise under stirring and the mixture is boiled subsequently for eight hours. The hot reaction mixture is poured into 1000 ml. of cold water, the base, separating out as an oil, is dissolved in either, and the ethereal solution is dried with anhydrous soda. Gaseous hydrogen chloride is thereupon introduced into the ethereal solution upon vigorous stirring. The precepitating white crystals are sucked off, washed with ether, and dried. There is obtained 30.5 g. (=72%) o-diethyl-amino ethoxy-benzoyl-diphenyl amide hydrochloride, M.P.=201° C.

*Example 2*

A mixture of 95 g. (½ mole) of the potassium salt of o-hydroxy benzoic methyl ester, 500 ml. of benzene, 54 g. of dimethyl amino ethyl chloride, and a few crystals of potassium iodide, is boiled for 48 hours under reflux and stirring, then left to cool and extracted several times with dilute hydrochloric acid. The aqueous phase is then alkalized with concentrated soda lye and, then, the base is dissolved in ether. The ethereal solution is dried with soda, and the raw base is purified either by vacuum distillation (B.P.=180–190° C./30 mm., yield 46.8 g. =42%) or by precipitation as the hydrochloride and the recrystallization of the hydrochloride (M.P.=140° C. from alcohol/ether).

A quantity of 38 g. (2/10 mole) of the o-dimethyl-amino ethoxy benzoic methyl ester thus obtained is mixed with 18.6 g. of aniline, heated to about 120° C., and kept at this temperature for 30 minutes after the addition of 1 g. sodium in little pieces. On cooling, the mass solidifies. It is dissolved by heating with 100 ml. methanol; then the methanol solution is slowly poured under stirring into 500 ml. of 2% hydrochloric acid, extracted three times with ether and subsequently concentrated soda lye is added until the reaction becomes alkaline. Initially, the base precipitates as an oil but crystallizes very rapidly, M.P.=60° C. The conversion to the hydrochloride is effected as described hereinabove and yields 38 g. (=60%) o-dimethyl-amino ethoxy benzanilide hydrochloride, M.P.=228° C.

*Example 3*

A solution of 21.3 g. 1/10 mole) of o-hydroxy benzanilide in 200 ml. methyl-ethyl ketone is heated under stirring until it boils; 4 g. of NaOH are added and 14.8 g. of N-piperidine ethyl chloride dissolved in 50 ml. of methyl-ethyl ketone is added dropwise. The mixture is kept boiling for six hours under stirring and then poured, while hot, into 1000 ml. of cold water; thereupon the base formed in the reaction precipitates first as an oil but crystallizes very rapidly. After complete cooling and filtering by suction, the precipitate is thoroughly washed with water and dissolved in ether; the ethereal solution is extracted with dilute hydrochloric acid; and the base is separated from the aqueous solution of the hydrochloride with concentrated soda lye and crystallizes immediately. After filtering by suction, washing with water and drying, the yield of o-N-piperidine ethoxy benzanilide is 27.6 g. (=85%) M.P.=113° C.

The melting point of the hydrochloride is 179° C.

*Example 4*

A mixture of 34.4 g. (2/10 mole) of diethyl-amino ethyl chloride hydrochloride, 300 ml. of methyl-ethyl ketone, 42.6 g. of o-hydroxy benzanilide, and 16 g. of NaOH is heated slowly under stirring until it boils and is kept boiling for four hours. Thereafter, there is followed the method detailed in Example 3. It must be noted, however, that after introduction of the reaction mixture into water, the base, due to its lower melting point, crystallizes only after complete cooling. There is obtained 53.6 g. o-diethyl-aminoethoxy benzanilide (=86%), M.P.=44° C.

The hydrochloride melts at 173° C.

*Example 5*

A quantity of 31.2 g. (1/10 mole) of the base prepared as in Example 4 and 25.6 g. ethyl iodide are dissolved in 200 ml. of methyl-ethyl ketone and boiled for eight hours under reflux. Subsequently, about 100 ml. of solvent is distilled off, and the residue is poured into a beaker and mixed with 500 ml. of dry ether. The quaternary salt which formes in the reaction precipitates rapidly in crystalline form. After filtering by suction, washing with ether and drying, the yield is 44 g.=94%, MP.=166° C.

*Example 6*

A quantity of 21.3 g. (1/10 mole) of m-hydroxy benzanilide is dissolved in 200 ml. diethyl ketone and heated until it boils; then 4 g. of NaOH are added and 13.6 g. of diethyl-amino ethyl chloride, dissolved in 50 ml. diethyl ketone, are added dropwise under stirring. After boiling for three hours under reflux, the mixture is cooled and filtered, the solvent is evaporated from the residue and the latter mixed by stirring with 500 ml. water. The base is dissolved in ether, and the ethereal solution is dried and mixed with isopropanol hydrochloride. There is obtained 28.8 g. (=82%) m-diethyl-aminoethoxy benzanilide hydrochloride, M.P.=151° C.

Example 7

When using p-hydroxy benzanilide, there is obtained with a method corresponding to that of Example 6, the hydrochloride of p-diethyl-aminoethoxy benzanilide with a yield of 80%, M.P.=185° C.

Further examples of compounds in accordance with the present invention are:

o-Diethyl-amino ethoxy benzoyl-2-methyl anilide HCl, M.P.=169° C.;
o-Diethyl-amino ethoxy benzoyl-O-xylidide-HCl, M.P.=159° C.;
o-Diethyl-amino ethoxy benzoyl-2-chloroanilide-HCl, M.P.=120° C.;
o-Diethyl-amino ethoxy benzoyl-3-chloroanilide-HCl, M.P.=105° C.;
o-Diethyl-amino ethoxy benzoyl-4-chloroanilide-HCl, M.P.=162° C.;
o-Diethyl-amino ethoxy benzoyl-2-nitroanilide-HCl, M.P.=186° C.;
2-diethyl-amino ethoxy-5-chlorobenzanilide-HCl, M.P.=141° C.

We claim:
1. A compound selected from the group consisting of those having the following formula:

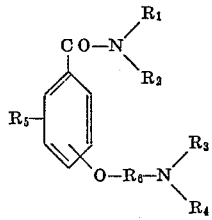

wherein $R_3$ is H or lower alkyl of one to four carbon atoms, $R_4$ is lower alkyl of one to four carbon atoms, $R_1$ is phenyl, methylphenyl, chlorophenyl or nitrophenyl, $R_2$ is H or phenyl, $R_5$ is H, and $R_6$ is lower alkylene of one to four carbon atoms.

2. A hydrohalide salt of a compound of claim 1.
3. A quaternary ammonium salt of a compound defined in claim 1.
4. N - (o-diethylaminoethoxybenzoyl) - N - phenyl-anilide.
5. O-dimethylaminoethoxy benzanilide.
6. O-diethylaminoethoxy benzanilide.
7. N-(o-diethylaminoethoxybenzoyl-2-chloroanilide.
8. N-(o-diethylaminoethoxybenzoyl)-3-chloroanilide.
9. N-(o-diethylaminoethoxybenzoyl)-4-chloroanilide.
10. P-diethylaminoethoxy benzanilide.

References Cited by the Examiner

FOREIGN PATENTS 221,691  10/1956  Australia.

OTHER REFERENCES

Faust et al., Jour. Am. Pharm. Assoc., vol. 45, pages 514–517 (1956).

German Patent (Auslegeschrift) 1,023,029, Jan. 23, 1958, 9 pp. spec.

ALEX MAZEL, *Primary Examiner.*

NICHOLAS S. RIZZO, HENRY R. JILES, *Examiners.*

ROBERT L. PRICE, JOSE TOVAR,
*Assistant Examiners.*